(12) United States Patent
Katou

(10) Patent No.: US 7,320,247 B2
(45) Date of Patent: Jan. 22, 2008

(54) TIRE PRESSURE DETECTION SIDE RECEIVING CIRCUIT AND TIRE MONITOR SYSTEM PROVIDED THEREWITH

(75) Inventor: Michiya Katou, Ogaki (JP)

(73) Assignee: Pacific Industrial Co., Ltd., Ogaki (JP)

( * ) Notice: Subject to any disclaimer, the term of this patent is extended or adjusted under 35 U.S.C. 154(b) by 0 days.

(21) Appl. No.: 11/545,576

(22) Filed: Oct. 11, 2006

(65) Prior Publication Data
US 2007/0251309 A1    Nov. 1, 2007

(30) Foreign Application Priority Data
Apr. 27, 2006    (JP) ............................ 2006-123645

(51) Int. Cl.
*G01M 17/02* (2006.01)
(52) U.S. Cl. ........................ 73/146; 340/447
(58) Field of Classification Search .......... 73/700–756, 73/146–146.8; 340/442–447
See application file for complete search history.

(56) References Cited

U.S. PATENT DOCUMENTS

| | | | | |
|---|---|---|---|---|
| 3,810,090 | A * | 5/1974 | Davis et al. ................ | 340/447 |
| 6,535,116 | B1 * | 3/2003 | Zhou .......................... | 340/447 |
| 6,788,192 | B2 * | 9/2004 | Shimura ..................... | 340/447 |
| 6,791,457 | B2 * | 9/2004 | Shimura ..................... | 340/448 |
| 2003/0107483 | A1 * | 6/2003 | Kano .......................... | 340/540 |
| 2007/0089525 | A1 * | 4/2007 | Momose et al. ............. | 73/753 |

FOREIGN PATENT DOCUMENTS

JP     A 2000-348147    12/2000
JP     A 2005-119370    5/2005

* cited by examiner

*Primary Examiner*—Edward Lefkowitz
*Assistant Examiner*—Jermaine Jenkins
(74) *Attorney, Agent, or Firm*—Oliff & Berridge, PLC (57) ABSTRACT

A tire pressure detection side receiving circuit includes an antenna resonance circuit having an antenna, a capacitor and a coil, a capacitance changing circuit for changing a capacitance of the capacitor, an oscillation circuit capable of imparting a test wave to the antenna resonance circuit, a resonance level detector capable of detecting a resonance level of the antenna resonance circuit, a memory storing preset reference frequency, a resonance frequency detector changing a frequency of the test wave to be imparted to the antenna resonance circuit while the capacitor of the antenna resonance circuit is maintained at a constant capacitance, thereby detecting, as a measured resonance frequency, a frequency in a case where an amplitude level of the test wave has reached a peak, and a tuning control controlling the capacitance changing circuit and changing the capacitor capacitance so that the measured resonance frequency is approximated to a reference frequency.

12 Claims, 9 Drawing Sheets

TIRE PRESSURE DETECTION SIDE RECEIVING CIRCUIT AND TIRE MONITOR SYSTEM PROVIDED THEREWITH

BACKGROUND OF THE INVENTION

1. Field of the Invention

The present invention relates to a tire pressure detection side receiving circuit provided in a tire pressure detector which is mounted on a wheel for detecting tire pressure, the tire pressure detection side receiving circuit receiving a radio signal from a vehicle body, and a tire monitor system provided with the tire pressure detection side receiving circuit.

2. Description of the Related Art

Conventional tire monitor systems generally comprise a tire monitor device mounted on a body of a vehicle such as automobile and tire pressure detectors mounted on wheels of the vehicle respectively. The tire monitor systems are configured so that information about tire pressure is communicated by radio between each wheel and the vehicle body. JP-A-2005-119370 discloses one of the conventional tire monitor systems.

In one of communication methods, a tire monitor device at the vehicle body side delivers a predetermined command by radio. In reply to the command, each tire pressure detector transmits information about results of detection of tire pressure over the radio.

A temperature of the tire considerably changes depending upon traveling conditions. The temperature changes of the tire changes the capacitance of a capacitor composing the tire pressure detector. The changes in the capacitance further change a resonance frequency of an antenna resonance circuit including the capacitor. As a result, there is a possibility that a radio signal transmitted from the vehicle body side cannot be received by the tire pressure detectors.

SUMMARY OF THE INVENTION

Therefore, an object of the present invention is to provide a tire pressure detection side receiving circuit which can stably receive the radio signal from the vehicle body and a tire monitor system employing the receiving circuit.

The present invention provides a tire pressure detection side receiving circuit provided in a tire pressure detector mounted on a wheel for detecting tire pressure and transmitting a result of detection to a body of a vehicle by radio, the receiving circuit receiving a radio signal from the vehicle body. The receiving circuit comprises an antenna resonance circuit having an antenna, a capacitor and a coil with two terminals, a capacitance changing circuit for changing a capacitance of the capacitor of the antenna resonance circuit, an oscillation circuit capable of imparting a test wave to the antenna resonance circuit, a resonance level detector capable of detecting a resonance level of the antenna resonance circuit, a memory storing data of preset reference frequency, a resonance frequency detector changing a frequency of the test wave to be imparted to the antenna resonance circuit while the capacitor of the antenna resonance circuit is maintained at a constant capacitance, thereby detecting, as a measured resonance frequency, a frequency in a case where an amplitude level of the test wave has reached a peak, and a tuning control controlling the capacitance changing circuit and changing the capacitance of the capacitor of the antenna resonance circuit so that the measured resonance frequency is approximated to the reference frequency.

The above-described tire pressure detection side receiving circuit is provided in the tire pressure detector and receives a radio signal from the vehicle body at the wheel side. For the purpose of improving the receiving performance, the tire pressure detection side receiving circuit carries out automatic tuning of the antenna resonance circuit at a predetermined time. More specifically, the oscillation circuit changes the frequency of the test wave imparted to the antenna resonance circuit, detecting, as the measured resonance frequency, the frequency in the case where the amplitude level of the test wave has reached the peak. The capacitor capacitance of the antenna resonance circuit is changed so that the measured resonance frequency is approximated to the reference frequency. Consequently, the antenna resonance circuit can be maintained at a high resonance level even when the temperature changes result in changes in the capacitor capacitance. Accordingly, the radio signal from the vehicle body can stably be received at the wheel side.

In one preferred embodiment, the capacitance changing circuit comprises a plurality of capacitor switching circuits each of which includes a capacitor and a switch element series connected to each other and is parallel connected between both terminals of the coil. In this case, when the capacitor capacitance of the antenna resonance circuit is changed, one of the capacitor switching circuits is selected. The switch element can be turned on and off to change a combination of the capacitor switching circuit which is rendered conductive and the capacitor switching circuit which is not rendered conductive.

In this case, an optimum on-off combination of the switch elements may be determined by trial and error. Alternatively, the tuning control performs an operation to obtain a compensated capacitor capacitance Cy based on an equation, $Cy = Cx \cdot (fj/fp)^2$, where fp is the reference frequency, fj is the measured resonance frequency and Cx is the capacitance of the capacitor at a time of detection of the measured resonance frequency. The optimum on-off combination of the switch elements may be determined based on the compensated capacitor capacitance Cy. Thus, when the optimum on-off combination is determined by the operation, the number of on-off operations of the switch element is reduced, whereupon production of noise can be suppressed.

Furthermore, the automatic tuning may be carried out every time a predetermined time lapses, or the tire pressure detector may be provided with a temperature sensor so that the automatic tuning is carried out when an amount of change in the temperature exceeds a predetermined value. Furthermore, the automatic tuning may be carried out every time the tire pressure detector performs radio transmission at a predetermined plurality of times.

Additionally, in the tire monitor system, the tire monitor device mounted on the vehicle body transmits a signal to the tire pressure detector mounted on the wheel, by radio. The tire pressure detector which has received the signal transmits the result of detection of tire pressure to the tire monitor device in reply to the signal, by radio. Consequently, presence or absence of abnormality in the detection result of tire pressure can be monitored at the vehicle body side.

BRIEF DESCRIPTION OF THE DRAWINGS

Other objects, features and advantages of the present invention will become clear upon reviewing the following description of the embodiment, with reference to the accompanying drawings, in which.

DETAILED DESCRIPTION OF THE INVENTION

Figure 1:
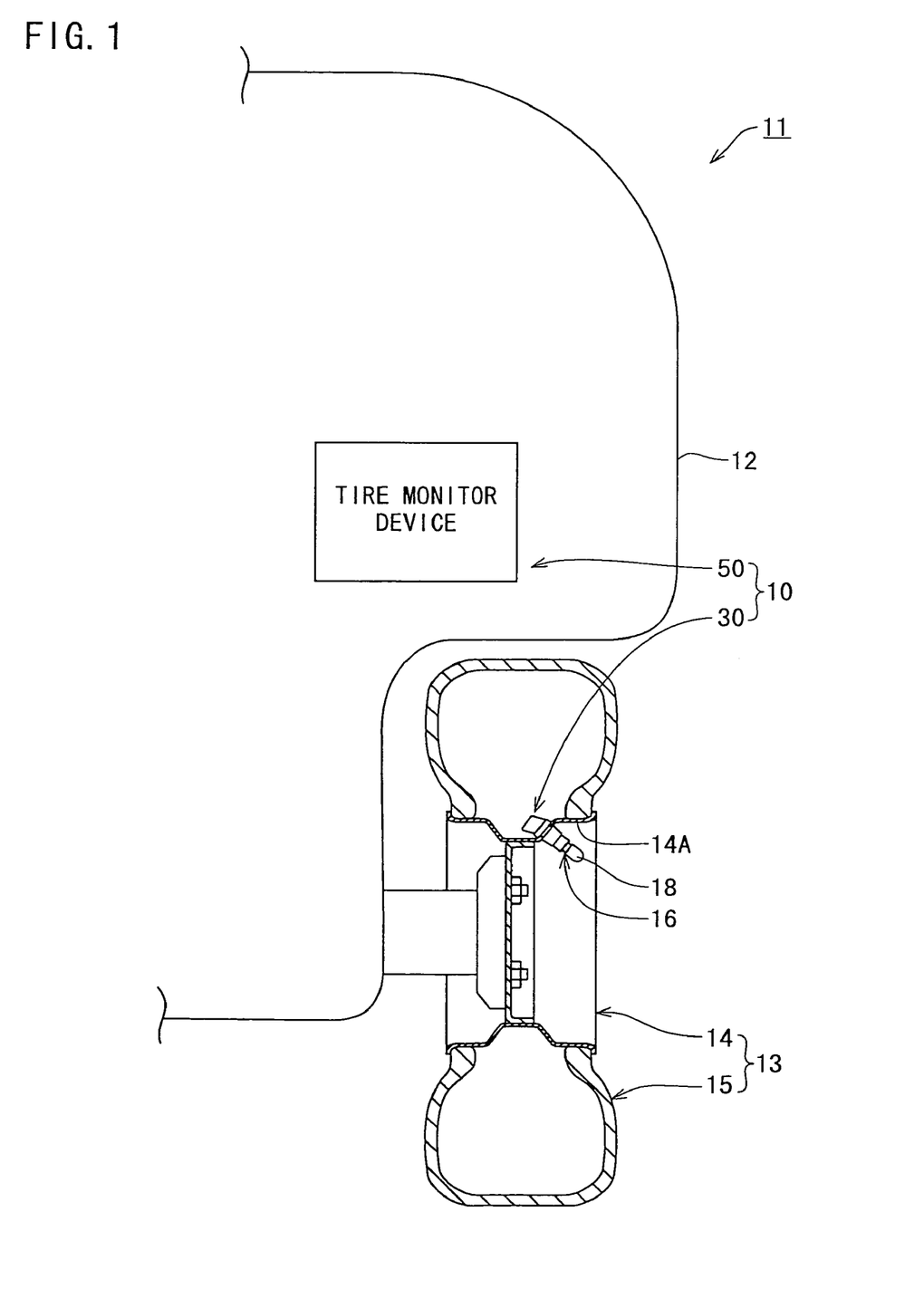
FIG. 1 is a conceptual diagram of a tire monitor system in accordance with one embodiment of the present invention.

One embodiment of the present invention will be described with reference to the accompanying drawings. Referring to FIG. 1, a tire monitor system 10 of the embodiment comprises, for example, four tire pressure detectors 30 mounted on respective wheels 13 of a vehicle 11 and a single tire monitor device 50 provided in a vehicle body 12. Only one of the wheels 13 is shown in FIG. 1.

Figure 3:
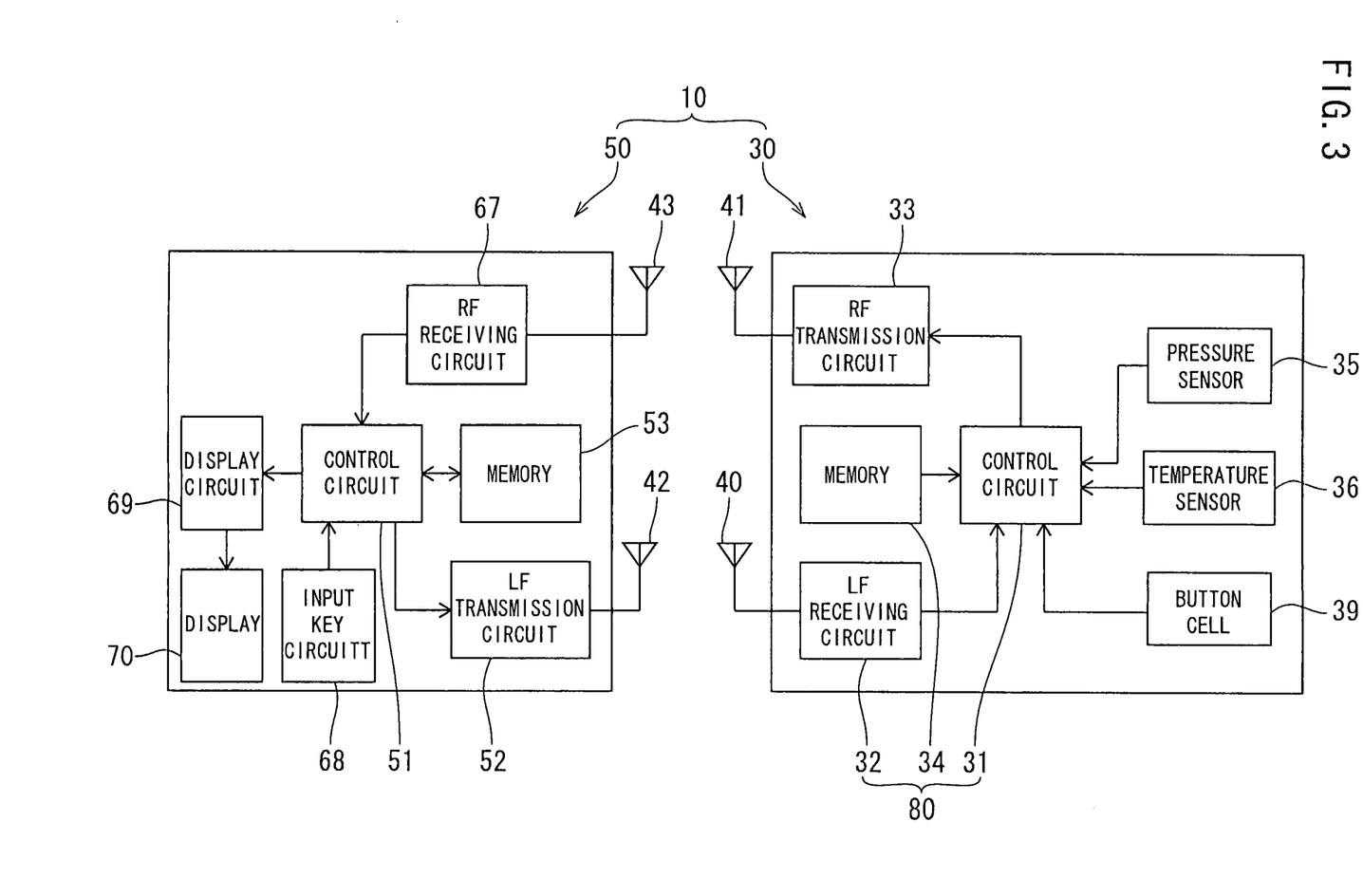
FIG. 3 is a block diagram showing an electrical arrangement of the tire monitor system.

The tire monitor device 50 is disposed, for example, in the rear of a dashboard (not shown) mounted on the vehicle body 12 and is connected to and activated by a vehicle battery (not shown) The tire monitor device 50 includes a control circuit 51, a low-frequency (LF) transmission circuit 52, a radio-frequency (RF) receiving circuit 67, an input key circuit 68, a memory 53, a display circuit 69 and a display 70 as shown in FIG. 3. The LF transmission circuit 52 and the RF receiving circuit 67 are provided with respective antennas 42 and 43.

The LF transmission circuit 52 delivers a radio signal, and each tire pressure detector 30 transmits results of detection of an inner pressure and temperature of a tire by radio in reply to the signal. The RF receiving circuit 67 receives the results of detection. Furthermore, the control circuit 51 determines whether the tire pressure and tire temperature are unusual, thereby driving the display circuit 69 so that warning or the like is displayed on the display 70 if necessary. The LF transmission circuit 52 carries out an amplitude shift keying (ASK) modulation based on, for example, a digital baseband signal. More specifically, the LF transmission circuit 52 includes an oscillation circuit (not shown) which delivers a carrier wave with a predetermined frequency. The LF transmission circuit 52 delivers the carrier wave as radio wave when a binary digital baseband signal from the control circuit 51 is at the level of "1." When the digital baseband signal is at the level of "0," the delivery of radio wave is stopped.

Figure 2:
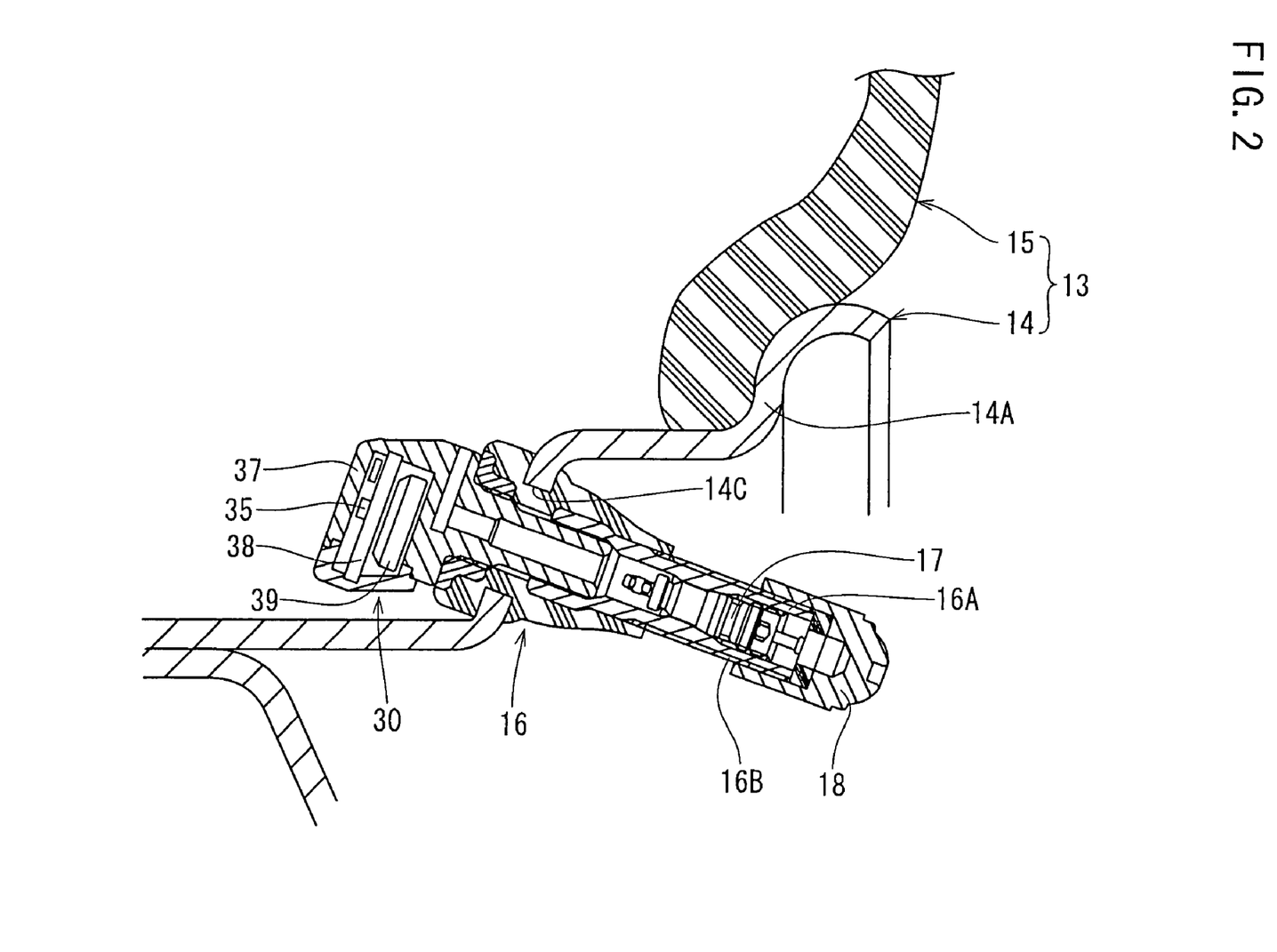
FIG. 2 is a sectional view of a wheel and a tire pressure detector.

On the other hand, the tire pressure detector 30 is mounted on each wheel 13 as shown in FIG. 2. More specifically, each wheel 13 comprises a tire wheel 14 having a rim 14A and a tubeless tire 15 fitted with the rim 14A. The rim 14A is formed with a valve mounting hole 14C through which a tire valve 16 is fixed. The tire valve 16 includes a cylindrical valve stem 16A having both open ends and a valve core 17 disposed in the valve stem 16A and having a check-valve structure. The tire valve 16 has a distal end protruding to an inner circumferential surface side of the rim 14A. On the other hand, the tire valve 16 has a proximal end protruding to an outer circumferential surface side of the rim 14A and disposed in the tire 15. The tire valve 16 has an outer surface formed with a male thread 16B. A cap 18 is in threaded engagement with a distal end of the male thread 16B. The tire pressure detector 30 mounted on each wheel 13 is fixed to the proximal end of the tire valve 16.

The tire pressure detector 30 comprises a case 37 fixed to the tire valve 16. A circuit board 38, a button cell 39 and the like are accommodated in the case 37. On the circuit board 38 are mounted a control circuit 31, a low-frequency (LF) receiving circuit 32, a radio frequency (RF) transmission circuit 33, a memory 34, a pressure sensor 35 and a temperature sensor 36 as shown in FIG. 3. The LF receiving circuit 32 and the RF transmission circuit 33 are provided with respective antennas 40 and 41.

The memory 34 stores various programs, identification data set for every tire pressure detector 30 and data of a reference frequency used in an automatic tuning as will be described later. In the embodiment, the reference frequency is set at the same value as the frequency of the carrier wave used when the tire monitor device 50 performs the radio transmission, for example.

Figure 4:
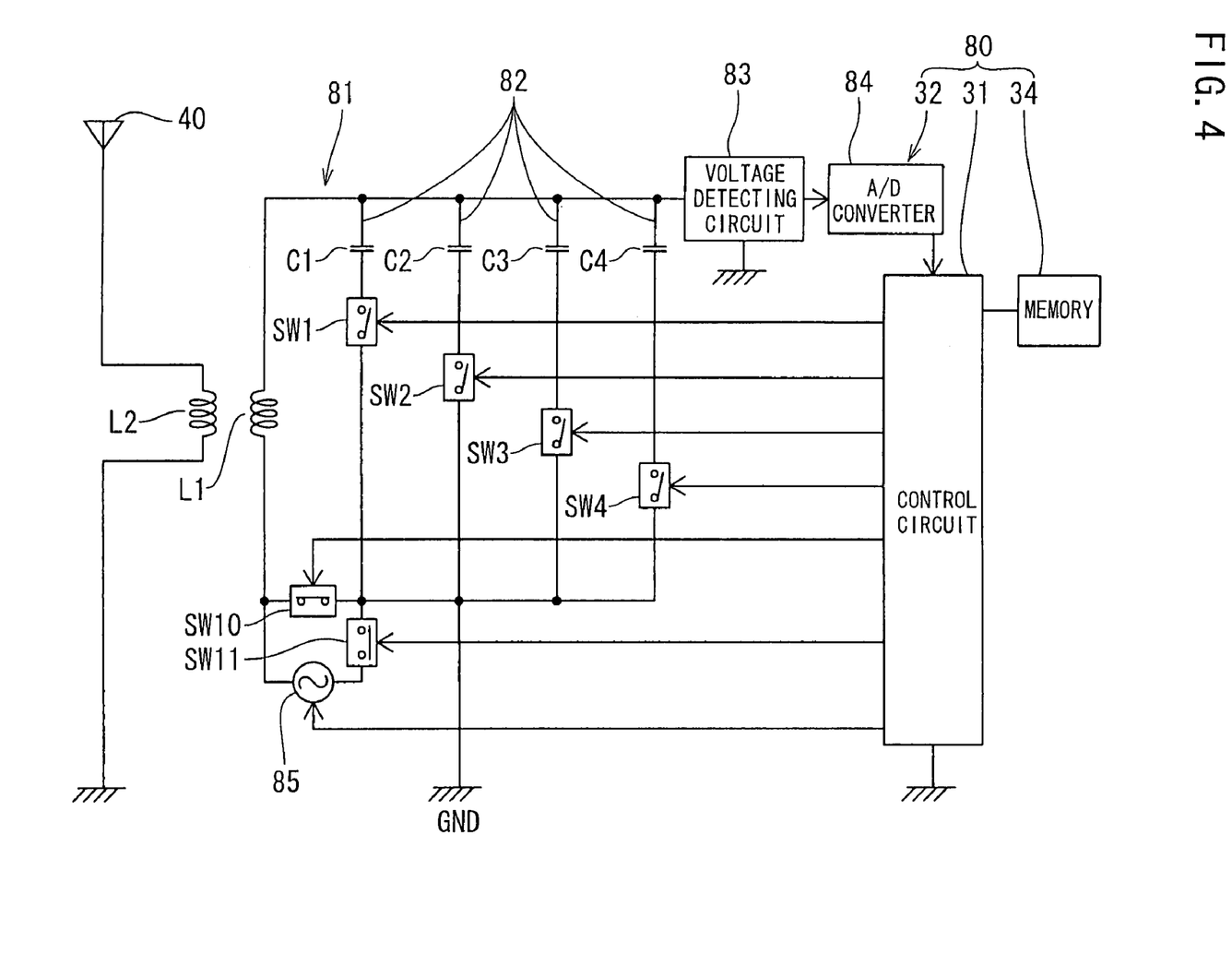
FIG. 4 is an electrical circuit diagram of a tire pressure detection side receiving circuit.

A tire pressure detection side receiving circuit 80 of the invention comprises the LF receiving circuit 32, the control circuit 31 and the memory 34 in each tire pressure detector 30. FIG. 4 shows in detail an electrical arrangement of the tire pressure detection side receiving circuit 80. An antenna resonance circuit 81 provided in the LF receiving circuit 32 includes a plurality of capacitor switching circuits 82 parallel-connected between both terminals of a coil L1. Furthermore, a coil L2 of the antenna 40 is connectable to the coil L1 by electromagnetic induction. The coil L1 may be used as an antenna instead of the above-described antenna 40. In this case, a core may or may not be provided for the coil L1.

Each capacitor switching circuit 82 is a series circuit of a capacitor C1 (C2, C3, ...) and a switch element SW1 (SW2, SW3, ...). Each capacitor switching circuit 82 is conductively connected to the coil L1 in any combination according to on-off states of the switch element SW1 (SW2, SW3, ...). As a result, the capacitance of the capacitor of the antenna resonance circuit 81 is changed such that the resonance frequency of the antenna resonance circuit 81 can be changed.

One of common nodes of the capacitor switching circuits 82 is connected to the ground (GND). A potential difference between the other common node of the capacitor switching circuits 82 and the GND is adapted to be detected by a voltage detecting circuit 83 (corresponding to a resonance level detector in the invention) Furthermore, the result of detection of the voltage detecting circuit 83 is supplied to the control circuit 31 through an analog-to-digital (A/D) converter 84.

An oscillation circuit 85 is connected to the antenna resonance circuit 81 via a switch element SW11. More specifically, a switch element SW10 of contact b is provided between one terminal of the coil L1 and one common node of the capacitor switching circuits 82. The oscillation circuit 85 is connected between both terminals of the switch element SW10 together with the switch element SW11 of contact a. The oscillation circuit 85 can deliver a test wave while gradually changing the frequency within a predetermined range.

Figure 5:
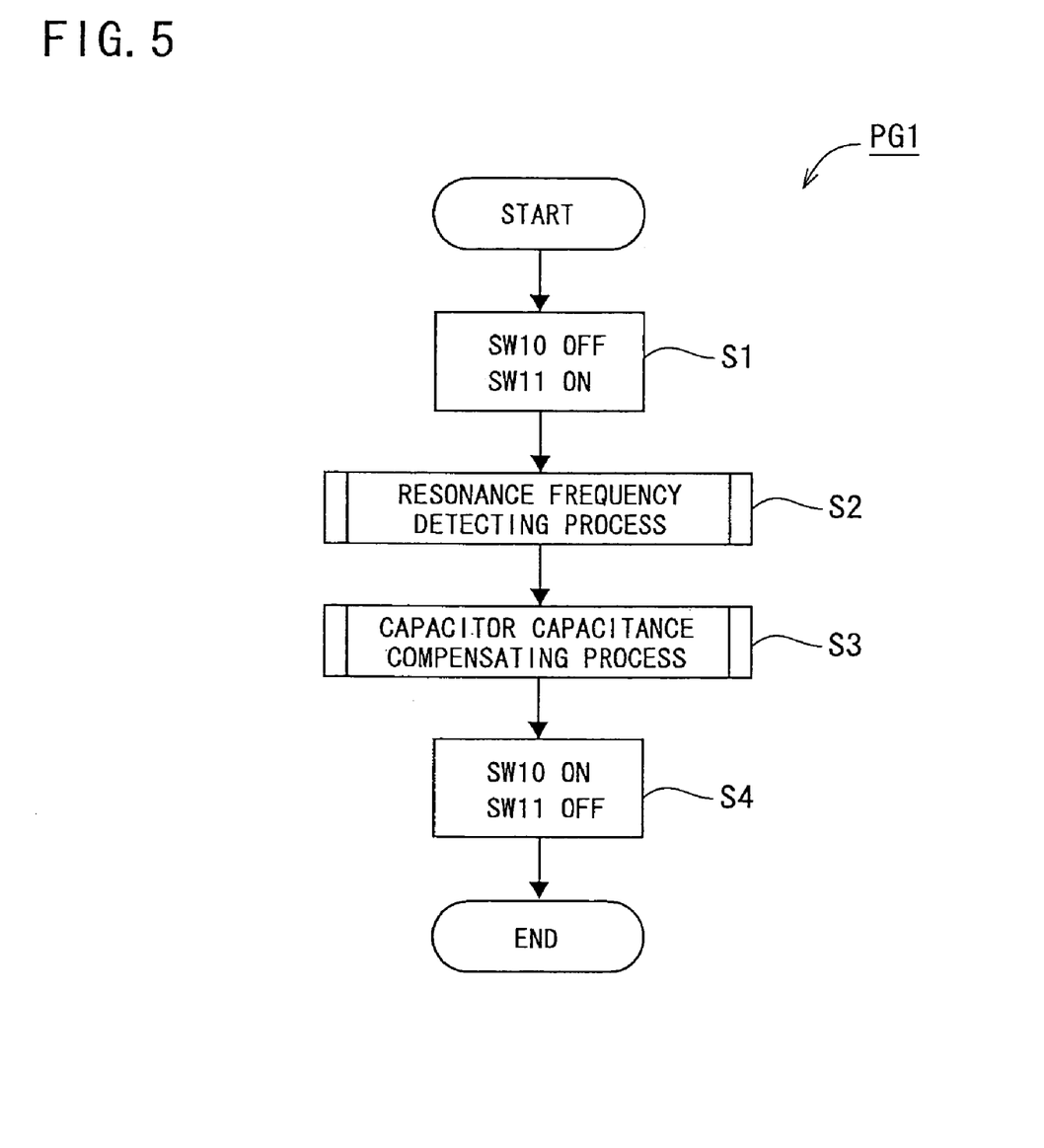
FIG. 5 is a flowchart showing an automatic tuning processing program.

The control circuit 31 carries out an automatic tuning program PG1 stored on the memory 34 to perform automatic tuning of the antenna resonance circuit 81. Upon execution of the automatic tuning program PG1, the switch element SW10 is turned off, while the switch element SW11 is turned on, as shown in FIG. 5. As a result, the oscillation circuit 85 is connected to the antenna resonance circuit 81 (S1). In this case, the switch elements SW1 to SW4 of the capacitor switching circuits 82 are maintained in a current state, for example.

Figure 6:
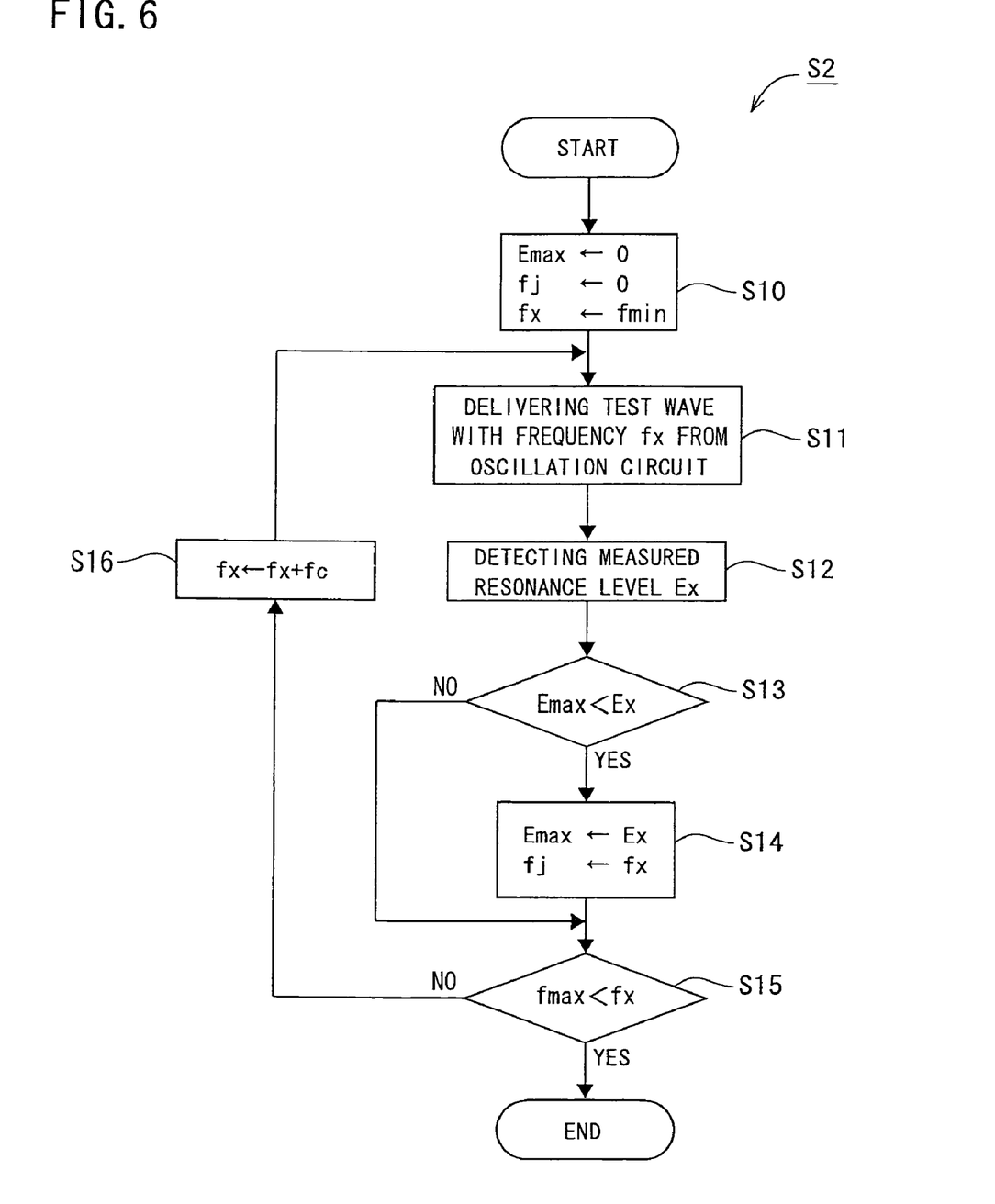
FIG. 6 is a flowchart showing a resonance frequency detecting process.

Subsequently, a resonance frequency detecting process (S2) is carried out. Initial values are set for a resonance level peak value Emax serving as a variable, a measured resonance frequency fj and a test frequency fx (S10), as shown in FIG. 6. The oscillation circuit 85 then imparts the test wave with the test frequency fx to the antenna resonance circuit 81 (S11). A resonance current flows into the antenna resonance circuit 81, whereby voltage between both terminals of the capacitor switching circuits 82 is detected as a measured resonance level Ex by the voltage detecting circuit 83 (S12).

Next, determination is made as to whether the measured resonance level Ex is higher than the resonance level peak value Emax (S13). When the measured resonance level Ex is higher than the resonance level peak value Emax (S13: YES), the resonance level peak value Emax is updated to the measured resonance level Ex and the measured resonance frequency fj is updated to the value of the test frequency fx (S14). On the other hand, when the measured resonance level Ex is not higher than the resonance level peak value Emax (S13: NO), update is not carried out.

Subsequently, it is determined whether the test frequency fx is higher than a preset maximum test frequency fmax (S15). When the test frequency fx is not higher than the maximum test frequency fmax (S15: NO), the test frequency fx is increased by a predetermined value fc (S16) and the above-described steps S11 to S14 are repeated. On the other hand, when the test frequency fx is higher than the maximum test frequency fmax (S15: YES), the resonance frequency detecting process (S2) is ended.

When the resonance frequency detecting process (S2) is thus carried out, the frequency of the test wave imparted to the antenna resonance circuit 81 is changed (swept) while the capacitor of the antenna resonance circuit 81 is maintained at a predetermined capacitance. As a result, the measured resonance frequency fj at the time the amplitude level has reached a peak thereof can be detected. Thus, when the resonance frequency detecting process (S2) is carried out, the control circuit 31 serves as a resonance frequency detector in the invention.

Figure 7:
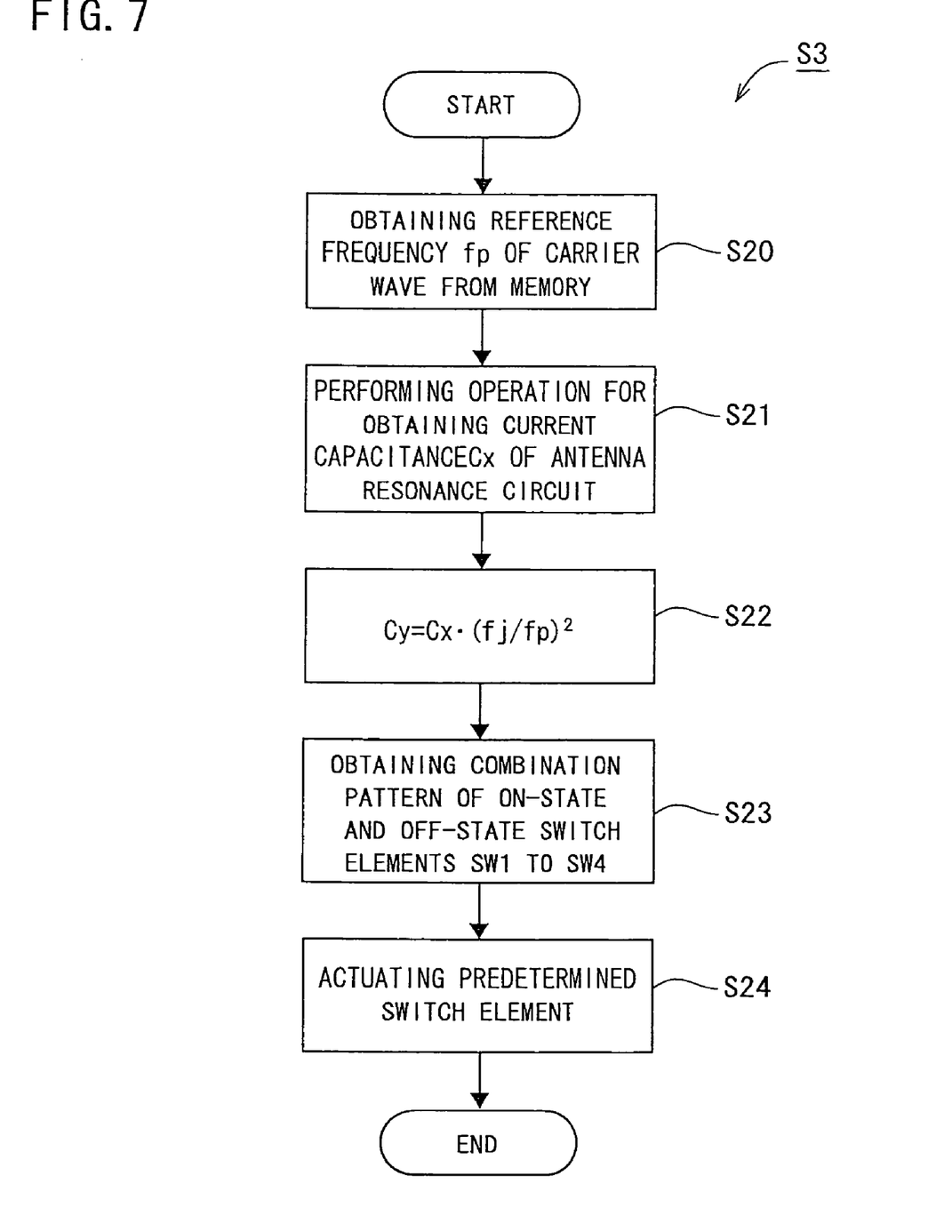
FIG. 7 is a flowchart showing a capacitor capacitance compensating process.

Upon end of the resonance frequency detecting process (S2), a capacitor capacitance compensating process (S3) is carried out as shown in FIG. 5. The control circuit 31 firstly obtains a reference frequency fp from the memory 34 (S20) as shown in FIG. 7. The control circuit 31 then obtains a capacitor capacitance Cx of the antenna resonance circuit 81 from the combination of the current on and off states of the switch elements SW1 to SW4 of the capacitor switching circuits 82 (S21). More specifically, the capacitance Cx is obtained as a sum of capacitances of the capacitors C1, C2, . . . provided in the capacitor switching circuits 82 of which the switch elements are on. Subsequently, a compensated capacitance Cy is obtained from the following equation (S22):

$$Cy = Cx \cdot (fj/fp)^2$$

Next, a predetermined one of the switch elements SW1 to SW4 of the capacitor switching circuits 82 is turned on in order that an actual capacitor capacitance of the antenna resonance circuit 81 may be most approximated to the compensated capacitance Cy, whereas the other switch elements are turned off. More specifically, the memory 34 stores a data table of a plurality of representative values of the compensated capacitance Cy and combinations of the switch elements SW1, SW2, . . . which are most suitable for approximating the actual capacitance of the antenna resonance circuit 81 to the representative value. The control circuit 31 executes an operation to obtain an optimum combination of the on-state and off-state switch elements from the data table, based on the compensated capacitance Cy obtained from the equation (S23). The switch elements are turned on or off according to an on-off combination of the switch elements determined from the data table (S24), whereupon the capacitor capacitance compensating process (S3) is ended.

When the capacitance compensating process (S3) is thus carried out, on-off control of the switch elements SW1 to SW4 is performed so that the measured resonance frequency fj is approximated to the reference frequency fp. As a result, the capacitor capacitance of the antenna resonance circuit 81 is changed. Thus, when the capacitance compensating process (S3) is carried out, the control circuit 31 serves as a tuning control of the invention.

When the capacitor capacitance compensating process (S3) is ended, the switch element SW10 is turned on, whereas the switch element SW11 is turned off, as shown in FIG. 5. As a result, the oscillation circuit 85 is separated from the antenna resonance circuit 81 (S4), whereupon the automatic tuning program PG1 is ended. As the result of execution of the program PG1, the resonance frequency of the antenna resonance circuit 81 is normally tuned to a value approximate to the reference frequency fp.

The operation of the tire monitor system will now be described together with the description of a main program PG2 each tire pressure detector 30 executes. The tire pressure detectors 30 are de-energized while an ignition key switch (not shown) of the vehicle 11 is off. When the ignition key switch is turned on, the tire monitor device 50 delivers a radio signal to each tire pressure detector 30 of each wheel 13.

Figure 8:
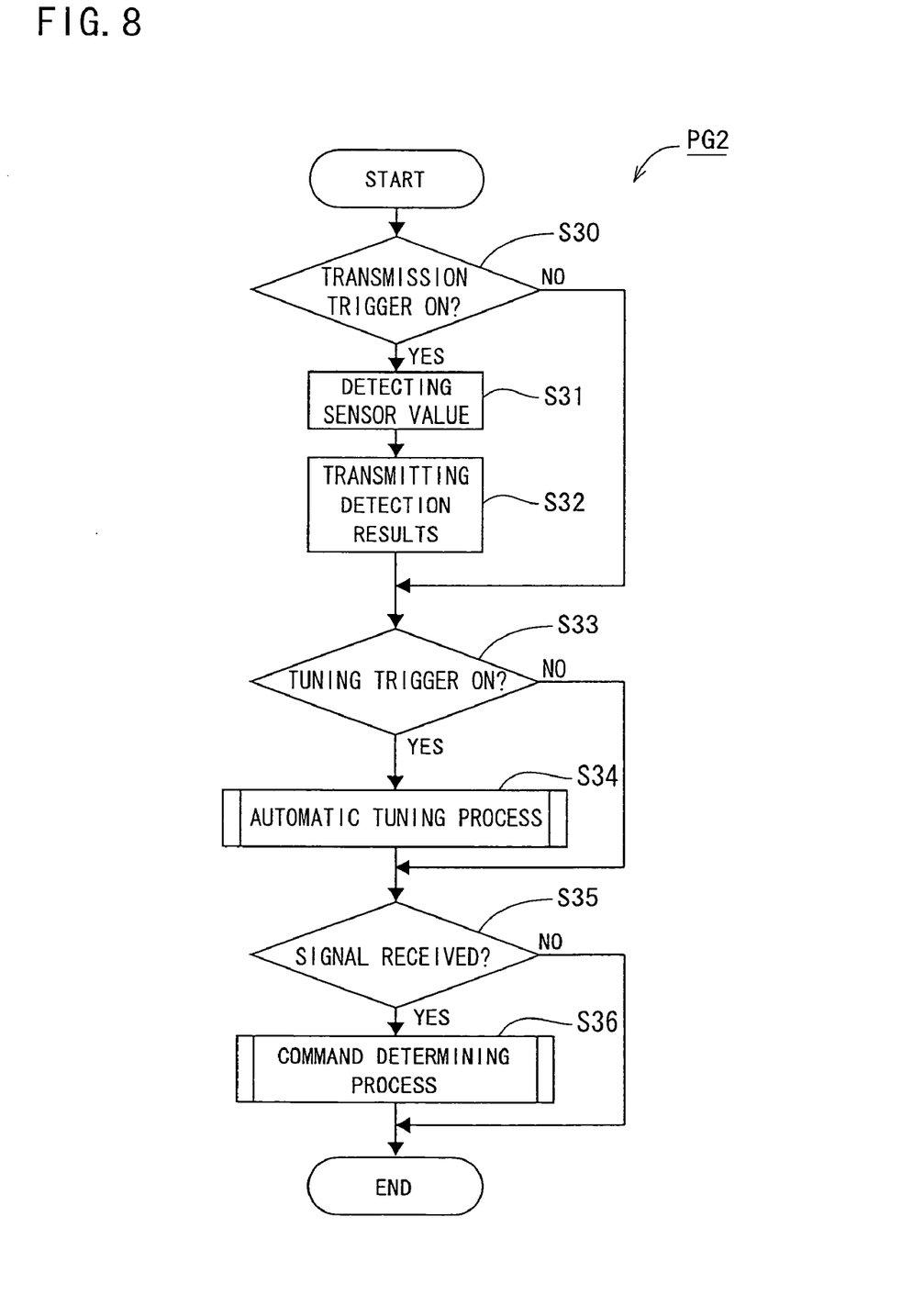
FIG. 8 is a flowchart showing a main program.

Each tire pressure detector 30 executes the automatic tuning program PG1 when having received the radio signal from the tire monitor device 50. Thereafter, each tire pressure detector 30 repeatedly executes the main program PG2 stored on the memory 34 at predetermined intervals (20 msec, for example). Upon execution of the main program PG2, as shown in FIG. 8, it is determined whether a transmission trigger is turned on (S30). The transmission trigger is turned on when the main program PG2 is initially executed or when a predetermined time (one minutes, for example) elapses after each tire pressure detector 30 has last transmitted by radio the results of detection by the pressure sensor 35 and the temperature sensor 36. The transmission trigger is turned off otherwise. When the transmission trigger is on (S30: YES), an internal pressure and temperature of the tire are detected by the pressure sensor 35 and the temperature sensor 36 (S31). The results of detection are transmitted by the RF transmission circuit 33 by radio (S32). Thereafter, it is determined whether a tuning trigger is on (S33).

On the other hand, when the transmission trigger is off (S30: NO), neither detection of tire pressure and tire temperature nor radio transmission of the results is carried out. It is determined whether the tuning trigger is on (S33). The tuning trigger is turned on when the detection of tire pressure and temperature has been counted the predetermined number of times, for example, four times after the last radio transmission by each tire pressure detector 30. The tuning trigger is turned off otherwise.

When the tuning trigger is on (S33: YES), the program PG1 is executed so that the automatic tuning is carried out (S34). When the tuning trigger is off (S33: NO), the automatic tuning is not carried out. More specifically, when the process is carried out for determining whether the tuning trigger is on (S33), the control circuit 31 serves as a tuning determiner in the invention.

Subsequently, the control circuit 31 determines whether each tire pressure detector 30 has received a radio signal from the tire monitor device 50 (S35). When each tire pressure detector 30 has received a radio signal (S35: YES), a command determining process (S36) is carried out and then, the main program PG2 is ended. When each tire pressure detector 30 has not received a radio signal (S35: NO), the main program PG2 is ended without execution of the command determining process (S36).

Figure 9:
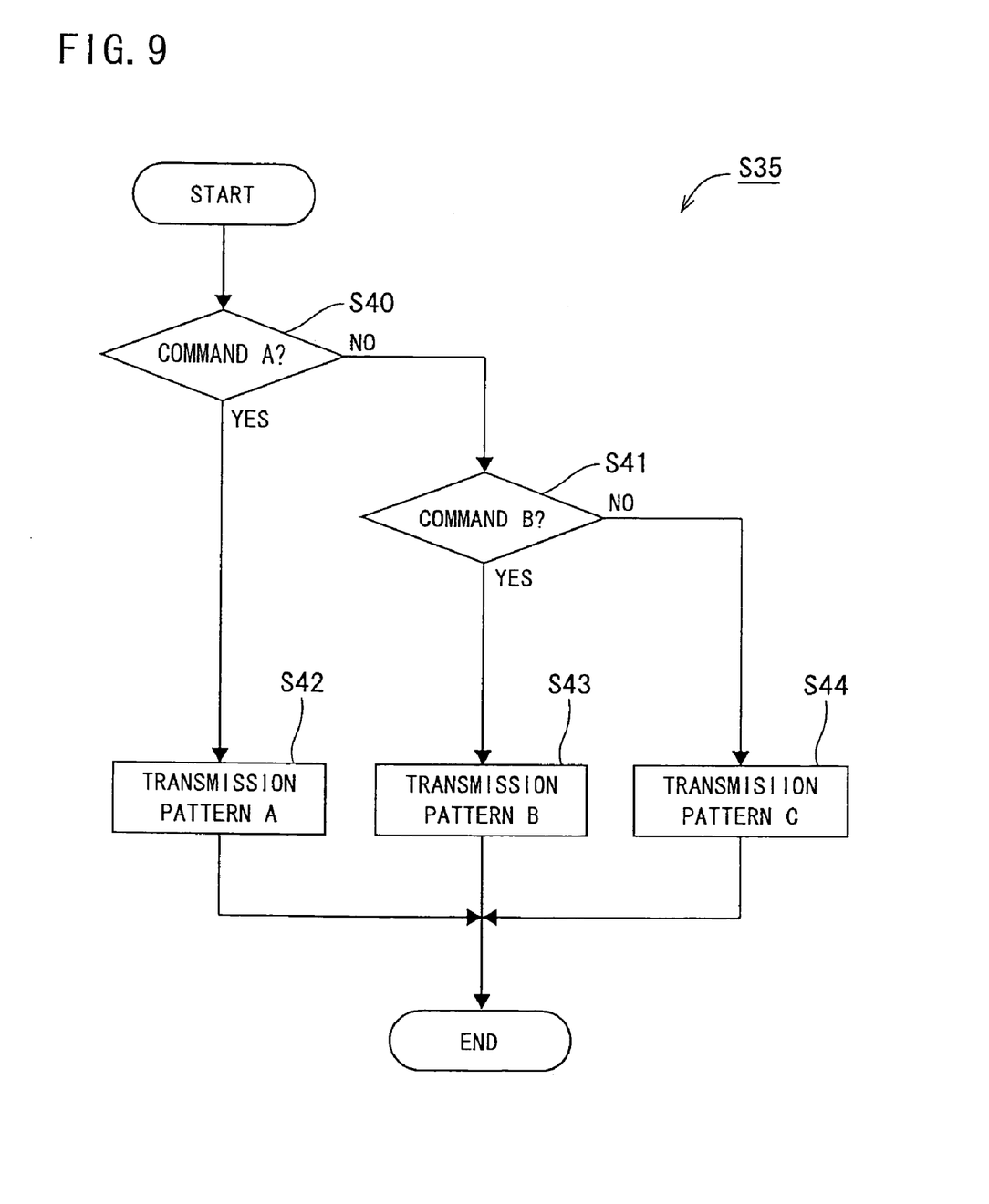
FIG. 9 is a flowchart showing a command determining process.

Upon execution of the command determining process (S36), as shown in FIG. 9, it is determined whether a command contained in a radio signal delivered from the tire monitor device 50 is a command A, a command B or a command other than A and B (S40 and S41). When the radio signal contains the command A (S40: YES), each tire pressure detector 30 checks break of wire or disconnection of a circuit thereof, delivering a result of the check as transmission pattern A, for example (S42). Furthermore, when the radio signal contains the command B (S40: NO; and S41: YES), each tire pressure detector 30 detects an amount of remaining electric energy of the button cell 39, delivering a result of the detection as transmission pattern B, for example (S43). Additionally, when the radio signal contains neither command A nor B (S40: NO; and S41: NO), the results of detection by the pressure sensor 35 and the temperature sensor 36 are continuously transmitted at a plurality of times as transmission pattern C, for example (S44).

Each tire pressure detector 30 is under the influence of heat when the corresponding tire 15 generates heat during drive of the vehicle. However, the tire pressure detection side receiving circuit 80 provided in each tire pressure detector 30 carries out the automatic tuning program PG1 at the predetermined time as described above, thereby automatically tuning the antenna resonance circuit 81. More specifically, the frequency of the test wave imparted to the antenna resonance circuit 81 by the oscillation circuit 85 is changed (swept). As a result, the frequency at the time the amplitude level has reached a peak thereof can be detected as the measured resonance frequency, and the capacitor capacitance of the antenna resonance circuit 81 is changed so that the measured resonance frequency is approximated to the reference frequency fp. Consequently, resonance level of the antenna resonance circuit 81 can be maintained high even when the temperature changes result in changes in the capacitor capacitance. Accordingly, the radio signal from the vehicle body 12 can stably be received at the wheel 13 side. Furthermore, the tire monitor device 50 at the vehicle body 12 side can obtain accurate information from each tire pressure detector 30 in reply to the radio signal delivered by the tire monitor device 50 and accordingly, failure of each tire 15 can be monitored at the vehicle body 12 side.

The invention should not be limited to the foregoing embodiment. The technical scope of the invention encompasses the following embodiments. Furthermore, the invention can be modified into various forms without departing from the gist thereof.

(1) The automatic tuning is carried out every predetermined plurality number of times each tire pressure detector 30 performs radio transmission in the foregoing embodiment. However, for example, the automatic tuning may be carried out every predetermined period of time elapses. Additionally, a temperature sensor may be provided on each tire pressure detector 30 and the automatic tuning may be carried out when an amount of change in the temperature exceeds a predetermined value.

(2) In order that the measured resonance frequency may be approximated to the reference frequency fp, an optimum combination of on-state and off-state switch elements is determined by operation. The optimum combination may be determined by trial and error, instead. However, when the tire monitor system is configured as described above in the foregoing embodiment, the number of times each switch element is switched on and off is reduced, and accordingly, production of noise can be suppressed.

(3) The reference frequency fp is set so as to be equal to the frequency of the carrier wave employed for radio transmission by the tire monitor device 50 in the foregoing embodiment. However, the reference frequency fp may or may not be equal to the frequency of the carrier wave.

(4) In the foregoing embodiment, the capacitor switching circuits 82 are provided as the capacitor changing circuit in the invention. Variable capacitance diodes each of which can change capacitance in an analogue manner may be provided, instead of the capacitor switching circuits 82.

(5) The detection level of the above-described voltage detecting circuit 83 differs among components of the antenna resonance circuit 81. In view of this problem, resistance switching circuits which are similar to the capacitor switching circuits 82 may be provided in parallel. Consequently, since the Q factor of the antenna resonance circuit 81 is changeable, generated voltage can be controlled, whereupon variations in the sensitivity can be suppressed.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A tire pressure detection side receiving circuit provided in a tire pressure detector mounted on a wheel for detecting tire pressure and transmitting a result of detection to a body of a vehicle by radio, the receiving circuit receiving a radio signal from the vehicle body, the receiving circuit comprising:

an antenna resonance circuit having an antenna, a capacitor and a coil with two terminals;

a capacitance changing circuit for changing a capacitance of the capacitor of the antenna resonance circuit;

an oscillation circuit capable of imparting a test wave to the antenna resonance circuit;

a resonance level detector capable of detecting a resonance level of the antenna resonance circuit;

a memory storing data of preset reference frequency;

a resonance frequency detector changing a frequency of the test wave to be imparted to the antenna resonance circuit while the capacitor of the antenna resonance circuit is maintained at a constant capacitance, thereby detecting, as a measured resonance frequency, a frequency in a case where an amplitude level of the test wave has reached a peak; and a tuning control controlling the capacitance changing circuit so that the measured resonance frequency is approximated to the reference frequency, thereby changing the capacitance of the capacitor of the antenna resonance circuit.

2. The receiving circuit according to claim 1, wherein the capacitance changing circuit comprises a plurality of capacitor switching circuits each of which includes a capacitor and a switch element series connected to each other and is parallel connected between both terminals of the coil.

3. The receiving circuit according to claim 2, wherein the tuning control performs an operation to obtain a compensated capacitor capacitance Cy based on an equation, $Cy=Cx\cdot(fj/fp)^2$, where fp is the reference frequency, fj is the measured resonance frequency and Cx is the capacitance of the capacitor at a time of detection of the measured resonance frequency, the tuning control further carrying out on-off control of the switch element of each capacitor switching circuit so that the capacitor capacitance of the antenna resonance circuit is approximated to the compensated capacitor capacitance.

4. The receiving circuit according to claim 3, further comprising a tuning determiner actuating the resonance frequency detector and the tuning control every predetermined plurality number of times the tire pressure detector performs radio transmission.

5. The receiving circuit according to claim 2, further comprising a tuning determiner actuating the resonance frequency detector and the tuning control every predetermined plurality number of times the tire pressure detector performs radio transmission.

6. The receiving circuit according to claim 1, further comprising a tuning determiner actuating the resonance frequency detector and the tuning control every predetermined plurality number of times the tire pressure detector performs radio transmission.

7. A tire monitor system including a tire pressure detector mounted on a wheel for detecting tire pressure and transmitting a result of detection to a body of a vehicle by radio and a tire monitor device mounted on the vehicle body for performing a radio communication with the tire pressure detector, the tire monitor system comprising:
 a tire pressure detection side receiving circuit provided in the tire pressure detector for receiving a radio signal from the vehicle body;
 an antenna resonance circuit provided in the tire pressure detection side receiving circuit and having an antenna, a capacitor and a coil with two terminals;
 a capacitance changing circuit provided in the tire pressure detection side receiving circuit for changing a capacitance of the capacitor of the antenna resonance circuit;
 an oscillation circuit provided in the tire pressure detection side receiving circuit and capable of imparting a test wave to the antenna resonance circuit;
 a resonance level detector provided in the tire pressure detection side receiving circuit and capable of detecting a resonance level of the antenna resonance circuit;
 a memory provided in the tire pressure detection side receiving circuit and storing data of preset reference frequency;
 a resonance frequency detector provided in the tire pressure detection side receiving circuit for changing a frequency of the test wave to be imparted to the antenna resonance circuit while the capacitor of the antenna resonance circuit is maintained at a constant capacitance, thereby detecting, as a measured resonance frequency, a frequency in a case where an amplitude level of the test wave has reached a peak; and
 a tuning control provided in the tire pressure detection side receiving circuit for controlling the capacitance changing circuit so that the measured resonance frequency is approximated to the reference frequency, thereby changing the capacitance of the capacitor of the antenna resonance circuit.

8. The tire monitor system according to claim 7, wherein the capacitance changing circuit comprises a plurality of capacitor switching circuits each of which includes a capacitor and a switch element series connected to each other and is parallel connected between both terminals of the coil.

9. The receiving circuit according to claim 8, wherein the tuning control performs an operation to obtain a compensated capacitor capacitance Cy based on an equation, $Cy=Cx\cdot(fj/fp)^2$, where fp is the reference frequency, fj is the measured resonance frequency and Cx is the capacitance of the capacitor at a time of detection of the measured resonance frequency, the tuning control further carrying out on-off control of the switch element of each capacitor switching circuit so that the capacitor capacitance of the antenna resonance circuit is approximated to the compensated capacitor capacitance.

10. The receiving circuit according to claim 9, further comprising a tuning determiner actuating the resonance frequency detector and the tuning control every predetermined plurality number of times the tire pressure detector performs radio transmission.

11. The receiving circuit according to claim 8, further comprising a tuning determiner actuating the resonance frequency detector and the tuning control every predetermined plurality number of times the tire pressure detector performs radio transmission.

12. The receiving circuit according to claim 7, further comprising a tuning determiner actuating the resonance frequency detector and the tuning control every predetermined plurality number of times the tire pressure detector performs radio transmission.

* * * * *